United States Patent [19]

Hankins et al.

[11] 4,270,086

[45] May 26, 1981

[54] ELECTROMAGNETIC PLUNGER DROP TIMER

[75] Inventors: Frederick E. Hankins, Flemington; John H. Umberger, Holmdel, both of N.J.

[73] Assignee: Research-Cottrell, Inc., Somerville, N.J.

[21] Appl. No.: 39,174

[22] Filed: May 15, 1979

[51] Int. Cl.³ .................... G04F 8/00; G04F 10/00
[52] U.S. Cl. ................................. 368/118; 324/178; 328/129
[58] Field of Search .............. 324/186, 178; 328/129, 328/130, 48; 307/247 R

[56] References Cited

U.S. PATENT DOCUMENTS

| 2,409,672 | 10/1946 | Fischer et al. | 324/178 |
| 2,482,184 | 9/1949 | Hoffman et al. | 324/178 |
| 3,567,951 | 3/1971 | Montgomery et al. | 324/178 |
| 4,031,373 | 6/1977 | Beckwith | 324/178 |

*Primary Examiner*—Alfred E. Smith
*Assistant Examiner*—Thomas P. O'Hare

[57] ABSTRACT

The time of travel of an electromagnetic rapping device plunger is measured between two predetermined points so that the height of lift of the plunger and the terminal velocity can be determined.

9 Claims, 4 Drawing Figures 4,270,086

ELECTROMAGNETIC PLUNGER DROP TIMER

I. DESCRIPTION

1. Technical Field

This invention relates to a system for measuring the velocity of a rapping device plunger and interpreting that velocity as a function of the lift-height of the plunger. Velocity is determined by timing the plunger as it accelerates due to gravitational forces between two light gates.

2. Background of Prior Art

Over the years, rapping has been accomplished by lifting a mass with various means and allowing it to drop under the force of gravity in a constrained way. A more recent development in rapping has been the use of electromagnetic means to raise the rapping weight. This has lead to more precise and ordered rapping operations and has led to technology which demands precise rapping impacts.

Prior to the present invention, rapping impacts were calculated by estimating the approximate height of the rapping weight lift and estimating the terminal velocity of the mass as it completed its fall. This approach has proved imprecise because the electromagnetic means does not always raise the mass to exactly that height which is estimated and therefore the terminal velocity varies.

Numerous means have been devised to measure the velocity of projectiles but they have been directed mainly to systems wherein velocities are constant, such as in ballistic projectiles and no prior consideration has been given to measuring the velocity of a free falling body in a constrained way to determine the height from which the body is dropping.

BRIEF SUMMARY OF THE INVENTION

A primary objective of the present invention is to provide a means to measure the travel time of an electromagnetic rapping device's plunger between two predetermined points so that the height of lift of the plunger and the terminal velocity thereof can be determined. The device includes a pair of yokes, each of which contains a means to generate a light beam and direct it across the yoke to a photoresponsive device. The yokes are fixed a predetermined distance apart and supported on a stand a calibrated distance from the impact point of the rapping weight or plunger.

The light responsive means of the two yokes are electrically coupled to an electronic timing device which begins a clocking function when the plunger passes through the light beam of the first yoke and ceases when the plunger breaks the light beam on the second yoke. This time interval is displayed so that an operator may calculate the height of lift of the plunger and the terminal velocity.

Another objective is to provide travel time information in the form of an electronic code which may be coupled to a pre-programmed, dedicated calculator which will automatically solve an equation and provide a direct readout of lift-height and terminal velocity.

The foregoing and other objectives of the invention will become apparent in view of the description of drawings and detailed description of the invention which follows.

DETAILED DESCRIPTION OF THE INVENTION

Figure 1:
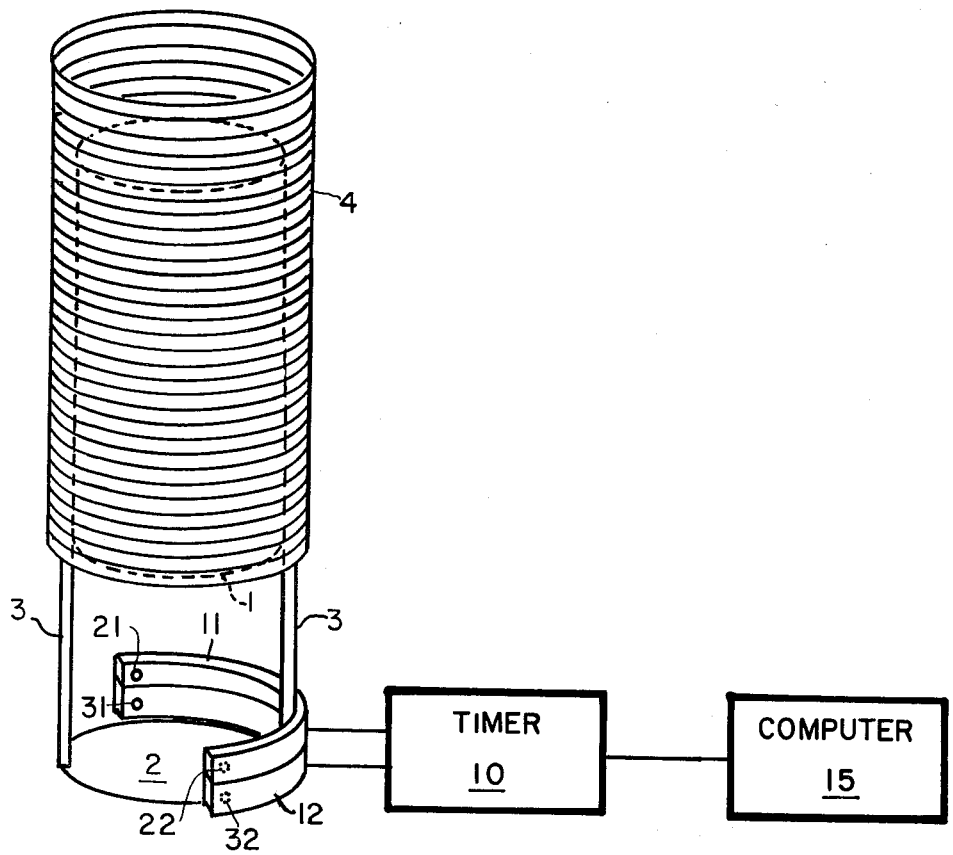
FIG. 1 is a stylized view of the electromagnetic plunger drop timer system connected to a rapping device.

The drop timer of the present invention is illustrated in FIG. 1 in a configuration adapted to measure the impact of a plunger 1 against a rapping surface 2. The rapping device includes a pluger constraining channel 3 which is partially enclosed by an electromagnetic coil 4, usually to the degree that the lift of the plunger is not visible to an observer. When energized, the coil raises plunger 1 an approximate distance up the channel from where it is released to fall to the base of the channel and impact the rapping surface 2.

Optical yokes 11 and 12 are positioned about the electromagnetic rapping device channel 3 so that a light beam in each yoke crosses the path of travel of the plunger 1. When the plunger reaches yoke 11, it breaks the light beam and a timing function is initiated in the drop timer and when the plunger reaches the light beam of yoke 12, that light beam is interrupted and a second function is created in the drop timer.

Yokes 11 and 12 are a predetermined distance apart and the timer calculates the time interval between the occurrence of plunger 1 breaking the light beam of yoke 11 and its subsequent interruption of the light beam of yoke 12. The time interval is displayed in a digital display device of the timer to permit an operator to calculate the velocity of the plunger as it passes between yokes 11 and 12.

In a preferred embodiment, the light beam of yoke 12 coincides with the impact surface 2 of the plunger and the light beam of yoke 11 is spaced a unit distance above so that the timer read out will be unit distance per time displayed which will coincide with terminal velocity. If yoke 12 is positioned a predetermined distance above the rapping surface 2. the operator may calculate the final terminal velocity by interpolation of the terminal velocity at yoke 12 to the terminal velocity at the impact surface.

The operator may calculate from the display of the time both the height above the yokes from which the plunger began its descent and the terminal velocity. Yokes 11 and 12 are positioned a predetermined distance above the rapping surface and therefore when the operator calculates the height above the yokes from which the plunger 1 began its descent, he will also know the height above the rapping surface through which the plunger fell and may then calculate terminal velocity of the plunger mass if it is not already known. The mass or channel of the plunger 1 is known so the energy of impact can also be calculated.

In a preferred embodiment, yokes 11 and 12 are spaced close enough together so that the plunger 1 will interrupt yoke 11, and then 12 while yoke 11 is still interrupted. In that embodiment, the timer measures the interval from when the light beam of yoke 12 is established by the raising of plunger 1 until the light beam of yoke 12 is interrupted by the subsequent fall of plunger 1. This time presents a complete rapping cycle and is stored in the timer 10. In addition to the complete rapping cycle time, timer 10 measures and stores the interval between the interruption of the light beam at yoke 11 and the light beam at yoke 12. This time is the terminal velocity time as previously discussed.

A pre-programmed, dedicated computer 15 is illustrated in FIG. 1. In an automatic mode of operation, the computer receives timing data from the timer and uses the information to calculate the velocity between the yokes, terminal velocity of plunger 1 at rapping surface 2, plunger lift height, and energy of impact. This automatic computing function can be accomplished by any of the well known mini computers presently available on the market. To use a general purpose computer or to create a special purpose computer, all that is required is that the electronic calculating device be programmed to solve the following equations:

$$t_B = \sqrt{\frac{1}{g}(4h - 2d - 4\sqrt{h^2 - hd}\,)}$$

Where
$t_B$ = the time to fall through the light gates created by yokes 11 and 12
g = the gravitational acceleration constant
h = the height of lift above the light gates of yokes 11 and 12.
d = distance between yokes 11 and 12

$$\text{Or, } h = \frac{1}{2gt_B^2}\left(d + \frac{gt_B^2}{2}\right)^2$$

$$\text{Or, } v = \frac{d}{t_B} + \frac{gt_B}{2}$$

where
v = the terminal velocity or the velocity at the location of yoke 12.

In the above equations the time of fall is provided with respect to the spacing between yokes 11 and 12, that is, if the yokes are prepositioned 1" apart the velocity can be determined in inches per time period by way of the following equation:

$$V = \frac{1 \text{ inch}}{t_B} + \frac{gt_B}{2}$$

The gravitational constant g is presented in the same units so that when the equation is solved either manually or by a computer for h, the height will be given in inches.

Once the height above yokes 11 and 12 is calculated, their height above the rapping surface 2 may be added and the velocity at impact may be calculated. If a dedicated computer is used for this purpose, the program can include a solution for the impact energy of the impact at rapping surface 2 by the following equation:

$$W = Fh$$

where
W = energy of rap, ft-lbs. or inch-pounds
F = the weight of the plunger, lbs. force
h = height of lift of plunger 1, inches or feet.

Figure 2:
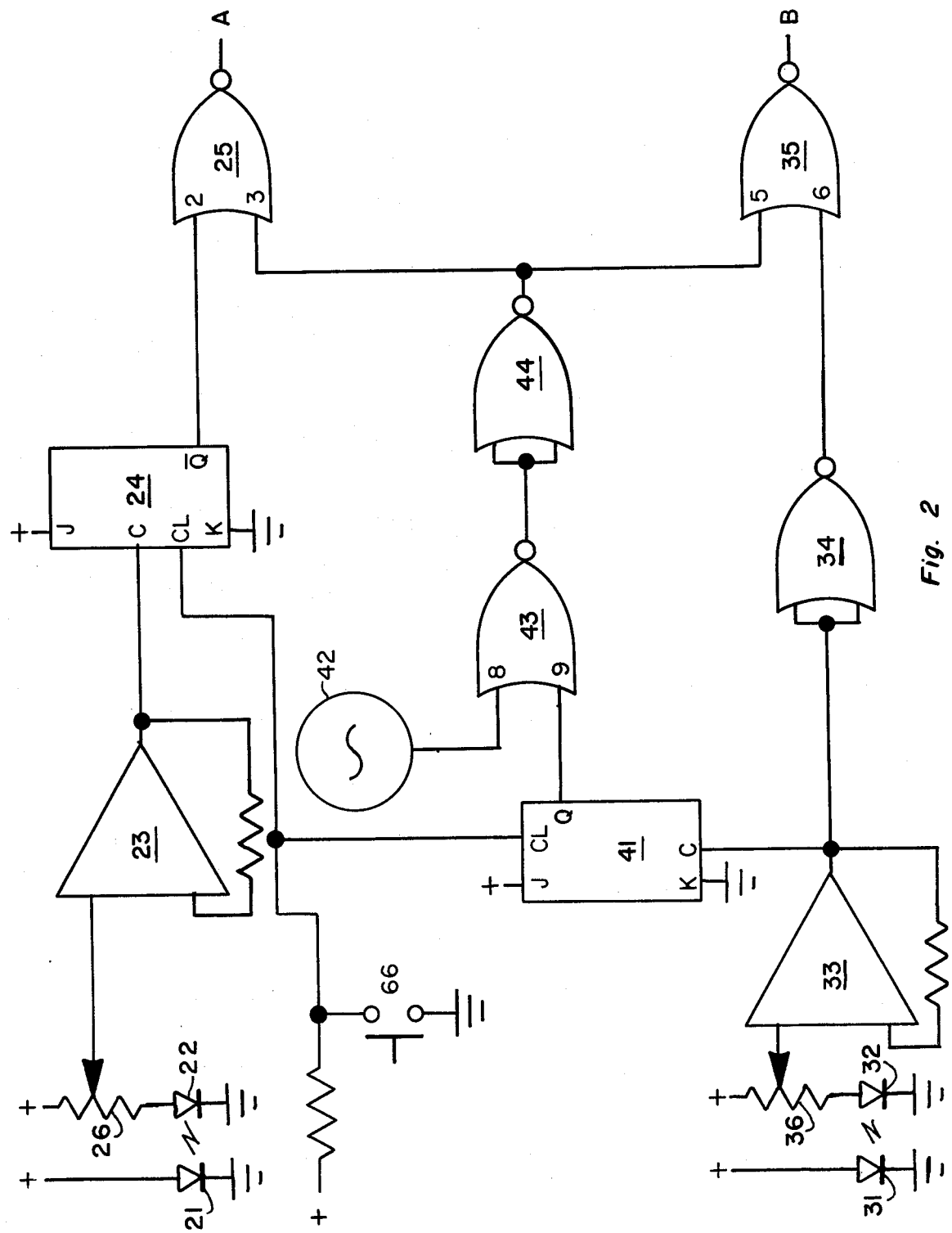
FIG. 2 is a schematic diagram of the timer activation circuitry.

The circuitry associated with the upper yoke 11 is illustrated in detail as the upper channel in FIG. 2. The upper channel is comprised of a light source 21, photoresponsive diode 22, amplifier 23, flip-flop 24, and NOR gate 25. Yoke 12 circuitry is illustrated in FIG. 2 by the lower channel which includes light source 31, light responsive diode 32, amplifier 33, inverter 34, and NOR gate 35.

In a preferred embodiment, the circuitry depicted in FIG. 2 is comprised of transistor logic elements whose functions may most easily be understood by considering the sequence of events which occur in a rapping cycle.

When the system is energized, the rapping device plunger 1 is at the bottom of the channel 3 and it prevents light from sources 21 and 31 from reaching their respective light responsive diodes 22 and 32. The light sources are illustrated as light emitting diodes but they may be incandescent lamps or similar structures.

In the quiescent state, with the plunger resting in the bottom of the channel, light responsive diode 22 is not illuminated and the output of operational amplifier 23 is low or a logic 0. The input to this amplifier is taken off of potentiometer 26 which is in the anode circuit of light responsive diode 22.

Amplifier 23 may be a type 3094 amplifier and its output functions as the clocking input to J-K flip-flop 24. J-K flip-flop 24 is one half of a type 7473 dual J-K level-triggered flip-flop. The J input is at a level 1 and the K input is at a level 0 or grounded so the $\overline{Q}$ output is high until the flip-flop is set by a negative going clock pulse. Thus, with plunger at rest, the output of J-K flip-flop 24 is high. This high is applied to the pin 2 input of NOR gate 25 and causes the output of the gate to be low. The output of the gate will remain low regardless of what is applied to the other input so long as the pin 2 input remains high, thus clock pulses are prevented from passing through the gate until the $\overline{Q}$ output of 24 goes low. This is caused only when the output of amplifier 23 transitions from a high to a low from raising the plunger 1 to permit diode 22 to be radiated which causes the output of amplifier 23 to go high and then dropping the plunger to break the radiation beam to diode 22.

In the lower yoke, light from source 31 is prevented from reaching diode 32 by the plunger so the output of operational amplifier 33, which is a type 3094 amplifier is low. The low output is applied to both inputs of NOR gate 34 to cause it to function as an inverter. All of the NOR gates illustrated in FIG. 2 are type 7402. The high output of NOR gate 34 is applied to the pin 6 input of NOR gate 35 and causes the output of NOR gate 35 to go low and remain there so long as a high input is present at pin 6 regardless of any input to pin 5.

The low output of operational amplifier 33 during the quiescent period is also applied to the clock input of J-K flip-flop 41. Flip-flop 41 is the second J-K flip-flop of the type 7473 integrated circuit which included flip-flop 24 in the upper channel. Flip-flop 41 has a high J input and a low K input in a fashion identical to flip-flop 24 so its outputs will be identical to flip-flop 24 for identical stimuli. The $\overline{Q}$ output of flip-flop 41 is ignored and the output is taken from Q so that it is the inverse of the output taken from flip-flop 24. Thus until flip-flop 41 is set, the Q output will be low. This low is applied to pin 9 of NOR gate 43 and has the effect of enabling the passage of inputs applied to its other input pin. The other input to NOR gate 43, the pin 8 input, is driven by clock 42 which is a 10 Kilohertz clock source of the type IC581. This clock source produces a series of positive pulses which are coupled through NOR gate 43 as negative pulses that are applied to NOR gate 44 which functions as an inverter. Thus a positive pulse train is applied to pin 3 of NOR gate 25 and pin 5 of NOR gate 35. The other inputs to NOR gates 25 and 35 are held constantly high during the quiescent state and therefore the clock pulse applied from NOR gate inverter 44 is not reflected through the upper and lower channel gates.

When the electromagnet of the rapping device is energized, the plunger is raised and light flows between source 31 and light responsive diode 32. This causes current to flow through diode 32 and a potential is created across potentiometer 36. This potential is adjusted so that the output of operational amplifier 33 will be a logic 1 when diode 32 is conducting. The logic 1 applied to J-K flip-flop 41 has no effect and NOR gate inverter 44 continues to provide a clock train of positive going pulses. The logic 1 output of amplifier 33 causes NOR gate inverter 34 to produce a low logic level output. This removes the inhibiting high logic level from pin 6 of NOR gate 35 and results in the NOR gate passing the clock pulse train from NOR gate inverter 44 to its output.

As the plunger continues to rise and uncover the light channel between light source 21 and photoresponsive diode 22, it causes current to flow through diode 22 and a potential is developed across potentiometer 26. An adjustable tap of potentiometer 26 provides an input to operational amplifier 23 which is calculated to cause a logic level 1 output when diode 22 is conducting. This high or logic level 1 input to J-K flip-flop 24 has no effect on the circuit and thus the output of NOR gate 25 remains a constant low.

After the plunger has reached its zenith and is released, it decends through the channel and interrupts the light path between light source 21 and diode 22. This causes the output of operational amplifier 23 to transition from a logic level 1 to a logic level 0. The negative going pulse clocks J-K flip-flop 24 and the $\overline{Q}$ output becomes low. This enables NOR gate 25 so that the positive pulse train from inverter NOR gate 44 will cause NOR gate 25 to produce a pulse train in response to the positive pulses applied to its pin 3 input. When the plunger interrupts the light path between light source 31 and 32 as it descends down the channel, it causes the logic 1 or high output of operational amplifier 33 to transition to a logic level 0 or low. This transition of the pulse from high to low clocks J-K flip-flop 41 and the Q output goes high. When the Q output of J-K flip-flop 41 goes high, it drives pin 9 of NOR gate 43 high and thus the output becomes a constant low and the pulse train from clock source 42 is inhibited. Thus the clock pulse train at the output of NOR gate 25 which commenced as the light path between source 21 and diode 22 was broken by the descending plunger is stopped and the clock pulse train at the output of NOR gate 35 which commenced when the plunger began its upward travel is also terminated.

The output pulse trains from NOR gates 25 and 35 of FIG. 2 may be utilized to drive a variety of count registering circuits, including computerized systems. However, in a preferred embodiment the output of NOR gate 25, A, is applied to an array of four DM75L52J decade counters and the output of NOR gate 35, B, is applied to a second array of four DM75L52J decade counters. These counters and their associated displays are illustrated in FIG. 3 with the inputs from FIG. 2 identified by corresponding letters A and B.

Figure 3:
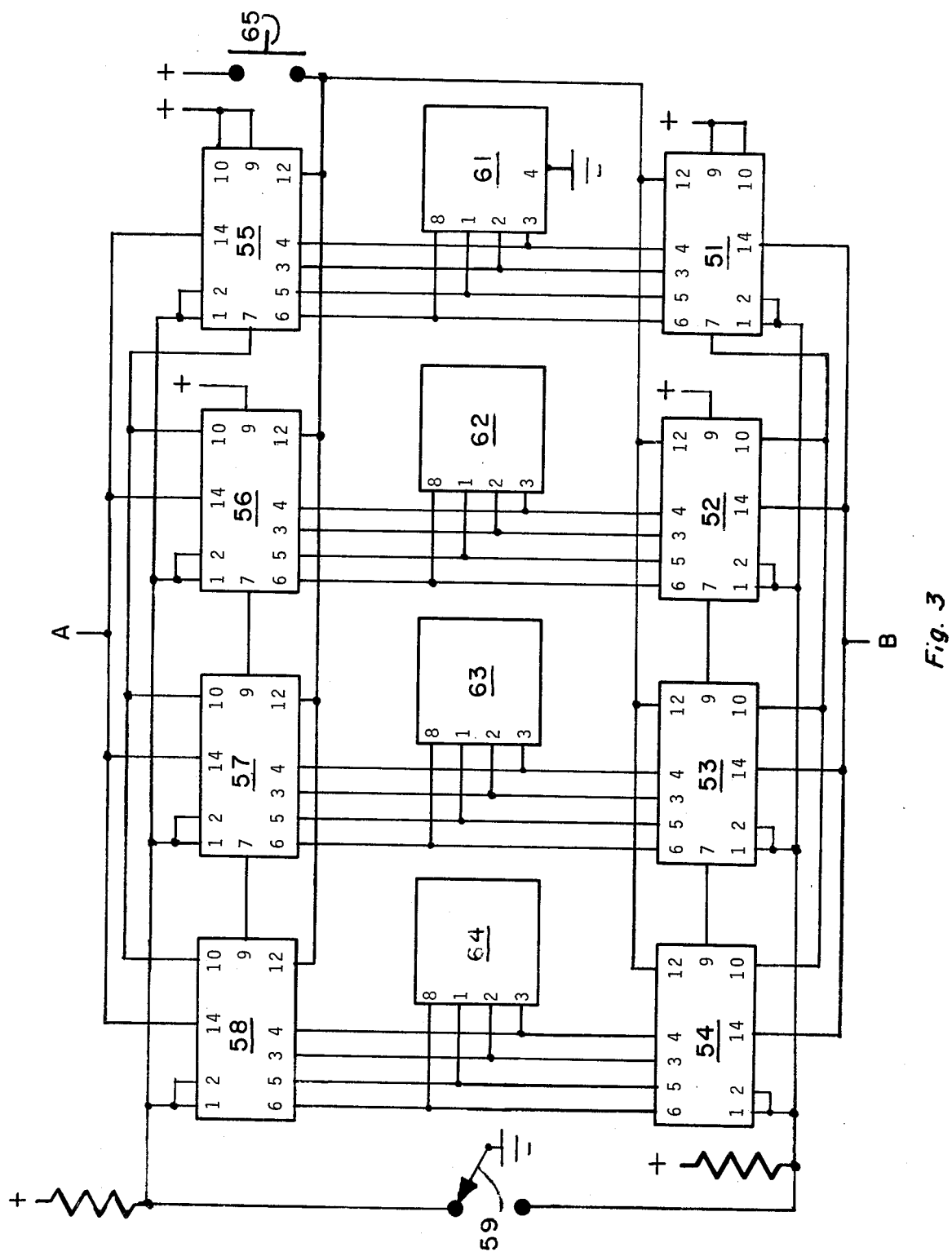
FIG. 3 is a schematic diagram of the acceleration timer.

Counters 51 through 58 of FIG. 3 are tristate synchronous counter/latches which will register a count as a function of clocking inputs applied to terminal 14 and hold that count, until reset, when the clocking inputs cease. The counters include a controllable third state which functions to inhibit the output of a counter under predetermined conditions in the circuit arrangement incorporated in FIG. 3. A single-pole double-throw switch 59 functions as a display switch and alternately removes the logic 1 level from the output disable inputs (terminals 1 and 2) of counters 51 through 54 or counters 55 through 58. Counters 51 through 58 function such that their outputs are placed in the third state whenever the output disable input of a counter is held at a logic 1 level. Thus display switch 59 causes the four digit display to be responsive to either the contents of counters 51 through 54 or counters 55 through 58 and display either the total cycle time as a function of the clock pulses counted from NOR gate 35 of FIG. 2 or the drop interval between yokes 1 and 2 as a function of the count of the pulse train from NOR gate 25.

When a rapping device cycle began, as explained with respect to the discussion of the FIG. 2 circuitry, NOR gate 35 began coupling a pulse train to the timer circuitry of FIG. 3. This pulse train is applied in parallel to the clocking inputs of counters 51 through 54. When the count begins, counter 51 will commence to count but counters 52 through 54 will not respond because their count enable inputs (terminal 10) are coupled to the terminal count output (terminal 7) of counter 51. The terminal count output remains low as the counter counts from 1 through 9 but when it recycles through 0, it goes high. Thus everytime counter 51 recycles it enables the count enable input (terminal 10) of counters 52 through 54. The tri-state counters used in the circuitry of FIG. 3 incorporate a two input AND gate function in the count enable circuitry. The inputs to the AND gate are terminals 9 and 10 of the counter. It can be seen by inspection of FIG. 3 that when counter 51 recycles it enables counters 52 through 54 at the terminal 10 input but only counter 52 can respond because the terminal 9 count enable input to counters 53 and 54 are tied to the terminal count output (terminal 7) of the preceding counter. When counter 52 recycles, counter 53 will increment 1 count to provide a tens digit and when counter 53 recycles, counter 54 will increment 1 count to provide a hundreds digit. The outputs of counters 51 through 54 are applied to indicators 61 through 64 in the form of binary coded decimal data with indicator 61 being the least significant digit and indicator 64 being the most significant digit.

In a preferred embodiment, an H-P 5082-7302 type display is utilized for each indicator and the least significant digit incorporates a grounded terminal 4 which causes a decimal point to be illuminated therein. A push-button reset switch 65 applies a logic level 1 or a high level to the reset input (terminal 12) of all eight counters to clear their registers and ready the counter for the next cycle. Switch 66 (of FIG. 2) is part of and is actuated simultaneously with switch 65 and applies a logic level 0 or a low level to reset J-K flip-flops 24 and 41 to their ready state for the next cycle.

Counters 55 through 58 are responsive to the clock pulse train passed by NOR gate 25 of FIG. 2. These counters function in a manner identical to that explained for counters 51 through 54. In the interest of brevity, that discussion will not be repeated since the outputs of counters 51 through 54 are parallel with the outputs of counters 55 through 58 and each set of four counters functions in an identical manner with the set of counters being displayed which is not inhibited by the display switch 59.

Figure 4:
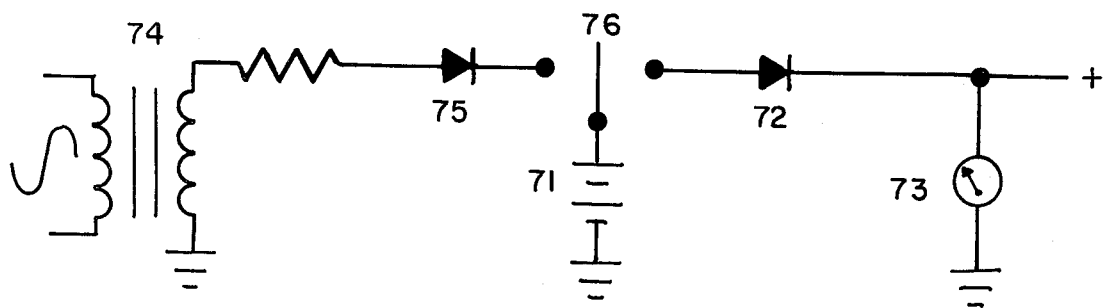
FIG. 4 is a schematic diagram of the system power supply.

Power without ripples or transients is supplied to the preferred embodiment by a rechargable battery system similar to that illustrated in FIG. 4. This power supply not only provides an economical means of obtaining a transient free power source but it also permits maximum portability of the test system.

The power source is comprised of a rechargeable battery pack 71 which is coupled to the circuitry of FIGS. 2 and 3 by a rectifier 72 which protects the circuitry in the event that the battery is installed in the incorrect polarity. A voltmeter 73 is incorporated in the power supply to provide an indication of the charged condition of the battery.

A simple charging circuit comprised of a step-down transformer 74 and a rectifier 75 is incorporated in the timer and coupled to the battery 71 through a double-pole triple-throw switch 76. This switch provides a charging position, an off position and an on position.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim and for which I desire Letters Patent is:

1. A timer, comprising:
   (a) a first radiation switch responsive to a radiation source and having a first radiation responsive means positioned apart from said radiation source for creating a first radiation circuit;
   (b) a second radiation switch responsive to a radiation source and having a second radiation responsive means positioned apart from said radiation source for creating a second radiation circuit;
   (c) means for producing a continuous train of clock pulses;
   (d) a clock pulse gate responsive to said second radiation switch for selectively passing said continuous train of clock pulses;
   (e) a first timing gate responsive to said first radiation switch for selectively passing said clock pulse train;
   (f) a second timing gate responsive to said second radiation switch for selectively passing said clock pulse train;
   (g) wherein said first and second radiation responsive means each include an amplifier circuit controlled by a radiation responsive diode for producing a first logic level signal when said radiation circuit is uninterrupted and a second logic level signal when said radiation circuit is interrupted; and
   (h) a first counter responsive to the clock pulse output of said first timing gate for registering the number of pulses which occur between the time that said first radiation circuit is interrupted and said second radiation circuit is interrupted before said first radiation circuit is reestablished.

2. A timer as defined in claim 1, wherein said clock pulse gate comprises:
   a bistable circuit having an output which assumes a high logic level in response to said second radiation switch amplifier output transitioning from a high logic level to a low logic level; and
   a logic gate controlled by said output of said bistable circuit for passing said continuous train of clock pulses only when said output of said bistable circuit is low.

3. A timer as defined in claim 2, wherein said first timing gate comprises:
   a bistable circuit for producing a low logic level output in response to an input from said first radiation switch amplifier transitioned from a high logic level to a low logic level; and a logic gate means controlled by said output of said bistable circuit for passing said clock pulse train only when said output of said bistable circuit is at a low logic level.

4. A timer as defined in claim 3, wherein said second timing gate comprises:
   a logic gate responsive to the output of said second radiation switch amplifier for passing said clock pulse train only when the output of said second radiation switch amplifier is at a high logic level.

5. A timer as defined in claim 1, comprising:
   a second counter for registering the number of clock pulses which occur between the time that said second radiation circuit is established and the time that said second radiation circuit is interrupted.

6. A timing circuit as defined in claim 5, comprising:
   digital display means for controllably presenting a display of the pulses registered in said first and said second counters.

7. A timing device comprising:
   (a) at least one radiation source:
   (b) a first radiation switching circuit having radiation responsive means positioned relative to said at least one source to produce a first radiation path, and having electronic means for producing a first output logic signal when said first radiation path is unobscured and a second output logic signal when said first radiation path is obscured;
   (c) a second radiation switching circuit having radiation responsive means positioned relative to said at least one source to produce a second radiation path, and having electronic means for producing a first output logic signal when said second radiation path is unobscured and a second output logic signal when said second radiation path is obscured;
   (d) a generator for producing a continuous train of clock pulses;
   (e) a clock pulse gate responsive to said second radiation switching circuit for passing said clock pulses except after said second radiation switching circuit has transitioned from said first output logic signal to said second output logic signal;
   (f) a first timing gate connected to said clock pulse gate and to said first radiation switching circuit and responsive to said first radiation switching circuit for enabling the passage of said clock pulses starting when said first radiation switching circuit begins producing said second output logic signal and responsive to said clock pulse gate for disabling the passage of said clock pulses starting when said second radiation switching circuit begins producing said second output signal; and
   (g) a first counter responsive to the passage enabled clock pulses from said first timing gate for registering the number of clock pulses occurring between said two output logic signals.

8. The timing device of claim 7 further comprising:

(a) a second timing gate connected to said second radiation switching circuit for enabling the passage of said clock pulses when said second radiation switching circuit is producing said first output logic signal; and
(b) a second counter responsive to the passage enabled clock pulses from said second timing gate for registering the number of clock pulses accumulated during said first output logic signal interval.

9. The timing device of claim 8 wherein said first output logic signals are a high logic level and said second output logic signals are a low logic level.

* * * * *